United States Patent
DuMas et al.

(10) Patent No.: US 8,289,900 B2
(45) Date of Patent: *Oct. 16, 2012

(54) APPARATUS AND METHOD FOR DYNAMICALLY UPDATING AND COMMUNICATING WITHIN FLEXIBLE NETWORKS

(75) Inventors: Phillip James DuMas, DeLand, FL (US); Larry Alan Williamson, Lake Mary, FL (US)

(73) Assignee: F4W, Inc., Lake Mary, FL (US)

( * ) Notice: Subject to any disclaimer, the term of this patent is extended or adjusted under 35 U.S.C. 154(b) by 686 days.

This patent is subject to a terminal disclaimer.

(21) Appl. No.: 12/405,056

(22) Filed: Mar. 16, 2009

(65) Prior Publication Data

US 2009/0238096 A1 Sep. 24, 2009

Related U.S. Application Data

(63) Continuation of application No. 11/383,775, filed on May 17, 2006, now Pat. No. 7,515,560.

(60) Provisional application No. 60/715,705, filed on Sep. 7, 2005, provisional application No. 60/714,743, filed on Sep. 7, 2005, provisional application No. 60/715,472, filed on Sep. 7, 2005.

(51) Int. Cl.
*H04Q 7/20* (2006.01)

(52) U.S. Cl. ..... 370/328; 370/338; 370/260; 455/422.1; 701/213

(58) Field of Classification Search ............... 370/328, 370/338, 260; 455/422.1; 701/213
See application file for complete search history.

(56) References Cited

U.S. PATENT DOCUMENTS

| | | | |
|---|---|---|---|
| 6,631,409 B1 * | 10/2003 | Watson et al. | 709/224 |
| 7,289,574 B2 * | 10/2007 | Parolari | 375/295 |
| 7,296,071 B2 | 11/2007 | Paila et al. | |
| 2002/0069261 A1 | 6/2002 | Bellare et al. | |
| 2004/0111599 A1 | 6/2004 | Jordan et al. | |
| 2005/0052994 A1 * | 3/2005 | Lee | 370/230 |
| 2005/0234643 A1 * | 10/2005 | Abraham et al. | 701/213 |
| 2005/0245256 A1 | 11/2005 | Takeichi et al. | |
| 2005/0266799 A1 | 12/2005 | Hara et al. | |
| 2006/0026627 A1 | 2/2006 | Yang et al. | |
| 2006/0176831 A1 | 8/2006 | Greenberg et al. | |
| 2007/0198937 A1 | 8/2007 | Paris | |

* cited by examiner

*Primary Examiner* — Danh Le
(74) *Attorney, Agent, or Firm* — The Eclipse Group LLP

(57) ABSTRACT

A software-based application dynamically updates user lists and enables communication between various network communication devices within a wireless network. The software-based application automatically builds and maintains a list of available users associated with the network communication devices in real-time, without reliance on a centralized server for authentication. Various types of communication, between network communication devices of the wireless network including text-based messaging, audio and video communication and file transfer are performed.

8 Claims, 16 Drawing Sheets

PANIC ALERT!

1300

| | |
|---|---|
| [5:29:13 PM] | -------- New Tactica Session Started -------- |
| [5:29:13 PM] | Now Entering the Public Communication Area... |
| [5:29:16 PM] | Money has Entered the Area. |
| [5:29:16 PM] | 1Larry Laptop has Entered the Area. |
| [5:29:21 PM] | Joe Mack has Entered the Area. |
| [5:29:22 PM] | Harry has Entered the Area. |
| [5:29:22 PM] | Phil's TB 73 has Entered the Area. |
| [5:29:25 PM] | Larry Home has Entered the Area. |
| [5:29:53 PM] | <Money> Looks Like Canada, no and F1 at one Time |
| [5:30:56 PM] | <Money> Harry You there? |
| [5:31:05 PM] | !!! SENT PANIC ALERT TO ALL USERS !!! |
| [5:31:05 PM] | PANIC ALERT: Money@10.127.112.79 |
| [5:32:43 PM] | <Money> Well I Guess we have a Corporate Communications System |
| [5:33:05 PM] | <Money> Harry I Can Hear You |
| [5:33:34 PM] | <Money> I Thought I was Attached to You |
| [5:33:50 PM] | <Money> am I Hearing him through You? |
| [5:34:00 PM] | <Money> Cool |
| [5:34:18 PM] | <Money> Its Meshing |
| [5:34:56 PM] | <Money> Did You Get the Press Release? |
| [5:35:40 PM] | <Money> First Thing AM it goes to Business Wire |
| [5:36:10 PM] | <Money> I do not See Ross |
| [5:37:20 PM] | <Money>Tell Ross the "Twins will be Walking by the Time he Gets Back |
| [5:37:21 PM] | Allan Edwards-LT has Entered the Area. |
| [5:38:18 PM] | <Money>No one has Cameras |
| [5:38:56 PM] | <Money> Who Sees Harry? |
| [5:39:03 PM] | Joe Mack has Signed off. |
| [5:39:03 PM] | (Videochat) [VIDEO] HARRY ATTACHED. |
| [5:39:03 PM] | (Videochat) [VIDEO] HARRY ATTACHED. |
| [5:39:08 PM] | Joe Mack has Entered the Area. |
| [5:39:18 PM] | Joe Mack has Signed off. |

APPARATUS AND METHOD FOR DYNAMICALLY UPDATING AND COMMUNICATING WITHIN FLEXIBLE NETWORKS

CROSS-REFERENCE TO RELATED APPLICATIONS

This application is a continuation of and claims priority to U.S. application Ser. No. 11/383,775, filed on May 17, 2006, titled APPARATUS AND METHOD FOR DYNAMICALLY UPDATING AND COMMUNICATING WITHIN FLEXIBLE NETWORKS, which claims priority under 35 U.S.C. §119(e) of U.S. Provisional Patent Application No. 60/715,705 filed on Sep. 7, 2005, U.S. Provisional Patent Application Ser. No. 60/714,743 filed on Sep. 7, 2005 and U.S. Provisional Patent Application Ser. No. 60/715,472 filed on Sep. 7, 2005; which application is incorporated by reference in this application in its entirety.

FIELD OF INVENTION

The present invention relates to wireless networks and more particularly to establishing and maintaining communications over mobile or ad-hoc networks, including structured and unstructured mesh networks.

BACKGROUND OF THE INVENTION

Network communication of data, voice or video often requires one or more servers or central access points for various applications to be executed within the network. In cellular communications, for instance, fixed base stations are used to provide communication with mobile devices, such as handsets. Such communication networks are often found to be inflexible due to the necessity of having fixed communication points and/or servers. Moreover, if a central control server becomes unavailable or inoperable for any reason (e.g., inclement weather, natural disaster, act of destruction, etc.), communication throughout the network may be lost.

Recently, self-forming wireless mesh networks have been developed. Although such communication platforms have been established, applications in this environment have been limited. The ability to dynamically update the universe of unique users participating within the mesh network as well as the provision of communications applications is desirable to many network users. This is often the case for users that are in a tactical environment in which a user depends on messaging as a tactical tool.

Accordingly, there is a need for a decentralized and flexible network architecture comprising these applications.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

FIG. 13 is an example of a log record identifying various communications within the wireless network.

DETAILED DESCRIPTION

Figure 1:
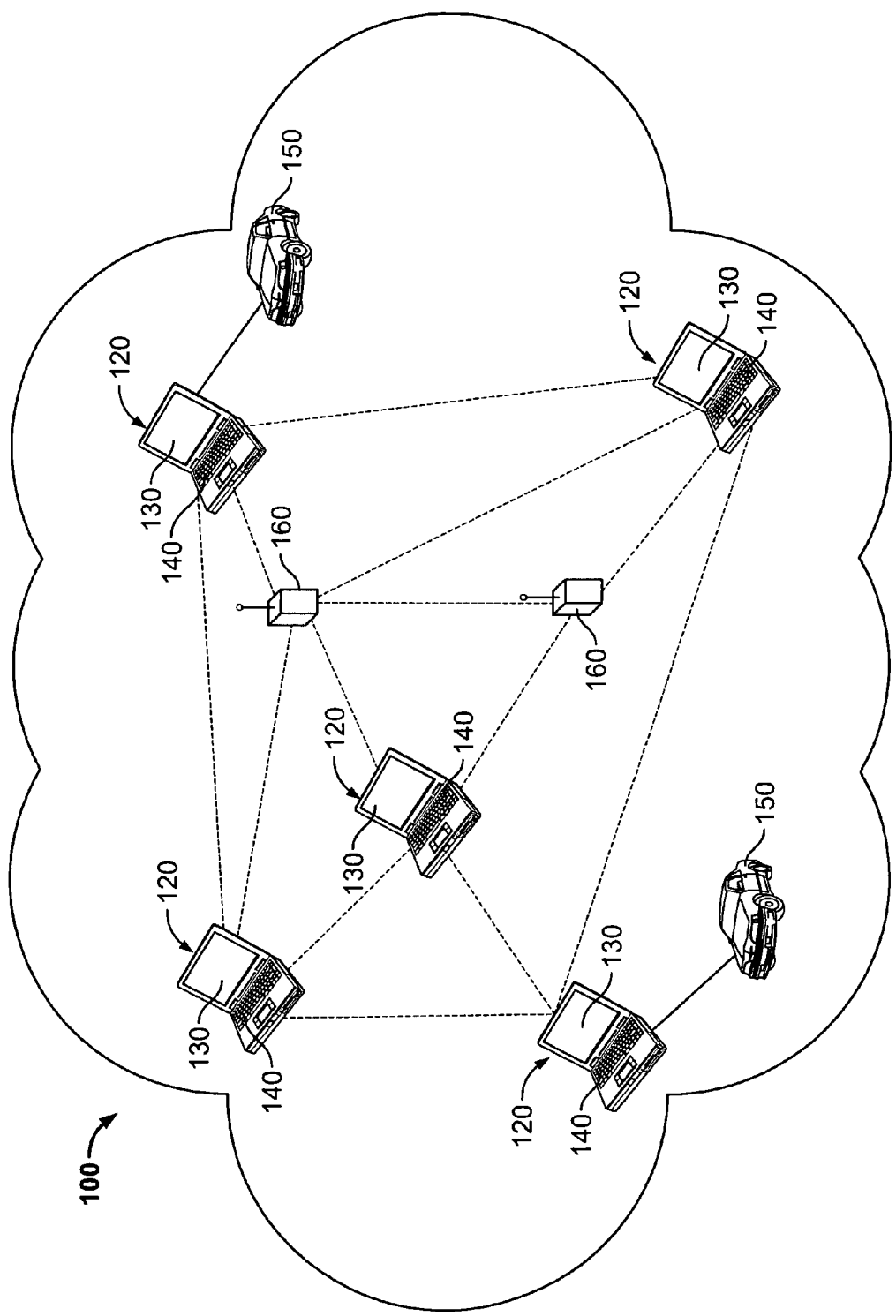
FIG. 1 is a system diagram depicting various network communication devices that communicate to form a mobile wireless network.

A software based application is provided, which enables the establishment and maintenance of and communication with various types of networks, including ad-hoc mobile networks and wireless mesh networks, with or without reliance on a centralized server used for authenticating and coordinating network communication devices entering the network. A mobile or ad-hoc network is a self-configuring network of communication devices connected by wireless links, each network communication device being free to move randomly and organize arbitrarily. Thus, the topology for the network may dynamically change depending on the location of the various network communication devices. The mobile or ad-hoc network is typically a local area network. A mesh network is a network that routes data between nodes in the absence of a centralized server used for authentication. Mesh networks provide continuous connections and reconfiguration around blocked paths by hopping from node to node in the most efficient path possible until connections can be established. Mesh networks are self healing, which means that the network can still operate even when a node or other connection is inoperable. Each node within the network authenticates the others. The nodes may, for example, be network communication devices, routers or network access points. Nodes are spaced at distances from each other in the local area of coverage for the wireless network. Increasing the number of nodes increases the distance the mobile wireless network can span.

These networks can be established and maintained through network participation packets sent between the various network communication devices within the network. The wireless networks are established through signaling between two or more network communication devices. Each network communication device transmits and receives signals from the other devices in the network. A core application process runs on the communication devices of the network and automatically builds and maintains a list of available users associated with the network communication devices in real-time. At start-up, the core application process searches for other network communication devices, and during operation monitors and updates the lists of available users on the network. As provided herein, the interaction between the network communication devices forms the mobile wireless network, and thus, a conventional network infrastructure of servers, routers, repeaters and the like are not required to create the network. The core application process enables users at the network communication devices to connect to one other in the absence of a single centralized server to form, for example, a mesh network. Text, voice and video communication is provided between the network communication devices within the wireless network independent of a centralized software platform. The wireless network formed through the interaction between the network communication devices is mutable such that it is able to run on many different communication platforms. The core application process is also adapted to run in traditional centralized or structured server environments.

The network communication devices of the wireless network are self-authenticating. The software-based network communication devices automatically search for available users (at other pre-configured network communication devices) to provide secure authentication and access for broadband network connectivity. The network communication devices send and receive voice, video and data to other network communication devices in the absence of a centralized server responsible for authenticating and coordinating network communication devices entering the wireless local area network. The network configuration devices provide direct peer-to-peer communication between devices in the network without the need for access points or a traditional wired network infrastructure.

A method for establishing and maintaining a wireless network is provided. The wireless network comprises network communication devices that correspond to a plurality of users. The network communication devices continuously broadcasting network participation packets to other network communication devices within a first predetermined interval, with each network participation packet comprising a unique user identifier corresponding to each user. The wireless network is established through receipt and processing of the network participation packets by the network communication devices. A database is provided within the network communication devices with the database comprising the unique user identifiers for the users within the wireless network. Remote user status variables are provided with each variable associated with one of the unique user identifiers. A determination of whether the network participation packets, associated with each user listed within the database, are being received within a second predetermined interval is performed. The remote user status variable is adjusted according to whether the network participation packets are being received within the second predetermined interval. At least one status request is sent to the network communication device of each user whose remote status variable has reached a predetermined threshold.

The network communication devices are adapted to communicate text, voice and video data with each other in the absence of a centralized server responsible for authenticating and coordinating the network communication devices entering the wireless network. A current status of audio and video capabilities for each user is sent throughout the wireless network to be updated at each network communication device upon receipt thereof. The remote user status variable may be an integer that increases by one each time the network participation packet is not received within the second predetermined interval. Adjusting the remote user status variable may include resetting the remote user status variable upon receipt of network participation packets from each network communication device within the second predetermined interval. Unique user identifiers may be removed from the database if a status request is not acknowledged.

A method for establishing and maintaining a wireless network is provided in which individual ones of the network communication devices correspond to a user. A database of a network communication device stores unique user identifiers with each unique user identifier associated with one of the users. Remote user status variables are also provided, with each remote user status variable associated with one of the unique user identifiers. At least one status request is sent to the network communication device of each user whose remote user status variable has reached a predetermined threshold. The wireless network provides text, voice and video communication between the network communication devices independent of a centralized software platform. Unique user identifiers are removed from the database if a status request is not acknowledged.

A network communication device for establishing and maintaining wireless communication in a local area network is further provided. The network communication device comprises a central processing unit, an input and a display screen and a memory component. The memory component has a network participation software module adapted to enable participation in a wireless network between network communication devices in the absence of a centralized server. The memory component further has a text transfer module adapted to a transfer a plurality of text-based messages throughout the network, wherein the display screen is adapted to display the plurality of text-based messages. An audio transfer module of the memory component is adapted to transfer audio from the network communication device to other network communication devices within the wireless local area network. A video transfer module is adapted to transfer video from the network communication device to other network communication devices within the network. The network participation software module is adapted to broadcast packets to the other network communication devices within the wireless network at a predetermined interval. The packets have a unique user identifier and user capabilities information. A file transfer module of the memory component is used for transferring files between the network communication devices. The memory component is provided with a panic alert module for sending a panic alert message to be displayed on a single display screen or all the display screens associated with network communication devices within the wireless local area network. The memory components stores a log of all text-based messages, audio and video communications, and file transfers between network communication devices within the wireless network. The text transfer module is adapted to send and receive private text-based messages between three or more users at network communication devices. Communication between the network communication devices in the wireless network is maintained while the network communication devices are in transit to different locations within the wireless network.

FIG. 1 illustrates a wireless local area network 100 with network communication devices 120 signaling with one another in forming the network. The network communication devices 120, in this example, include a display screen 130 for the presentation of information to users and a user input device 140 (such as a keyboard, keypad, mouse, stylus, touchscreen, or any other computer input device) for inputting information and performing actions at the network communication devices. For example, a network communication device 120 used in the mobile wireless network 100 may selectively be a laptop computer, personal computer (PC), wireless telephone, personal digital assistant (PDA), or any other device capable of receiving and/or transmitting voice, video or data. To provide network connectivity, the network communication devices 120 may utilize a wireless memory card device such as a WMC6300 model wireless modem memory card sold by Motorola, Inc. Each network communication device 120 is capable of routing data packets to other communication devices of the network.

The mobile wireless network 100 may be established and maintained while the network communication devices 120 are in transit to different locations. Thus, a network communication device 100 may be located in a traveling vehicle 150 during online operation of the network. Voice, video and text data connectivity is available to users (such as mobile or tactical team members) traveling in moving vehicles, for example, even at high speeds up to 200-250 m.p.h. The mobile wireless network 100 may selectively include other network nodes such as wireless routers 160 (or access points connecting with wired networks) that receive and transmit signals between each other and the other nodes (such as the network communication devices) of the network. As discussed herein, the network communication devices 120 of the network 100 may send and receive voice, video and text data without the necessity of a centralized control server.

Users operating network communication devices 120 comprising software applications can perform a variety of tasks. In brief summary, users can engage in text-based chatting with one another simultaneously as a broadcast function, similar to a chat room environment, chat privately with a sub-group of users or chat with a single individual in a separate window of a graphical user interface displayed at the network communication device. The user may also choose to send other users (selected as specific individuals or as a group) a file through a TCP stream-based file transfer. The network communication devices are also provided with audio and video communication capabilities within the wireless network. A video process optimized for low-bandwidth applications utilizing a streaming jpeg code for full streaming video may, for example, transmit real-time user images from a universal serial bus (USB) attached webcam, a network-addressable camera, or any available configured video feed in analog or digital format. A chat process is also provided that allows live chatting between video users at network communication devices.

Figure 2:
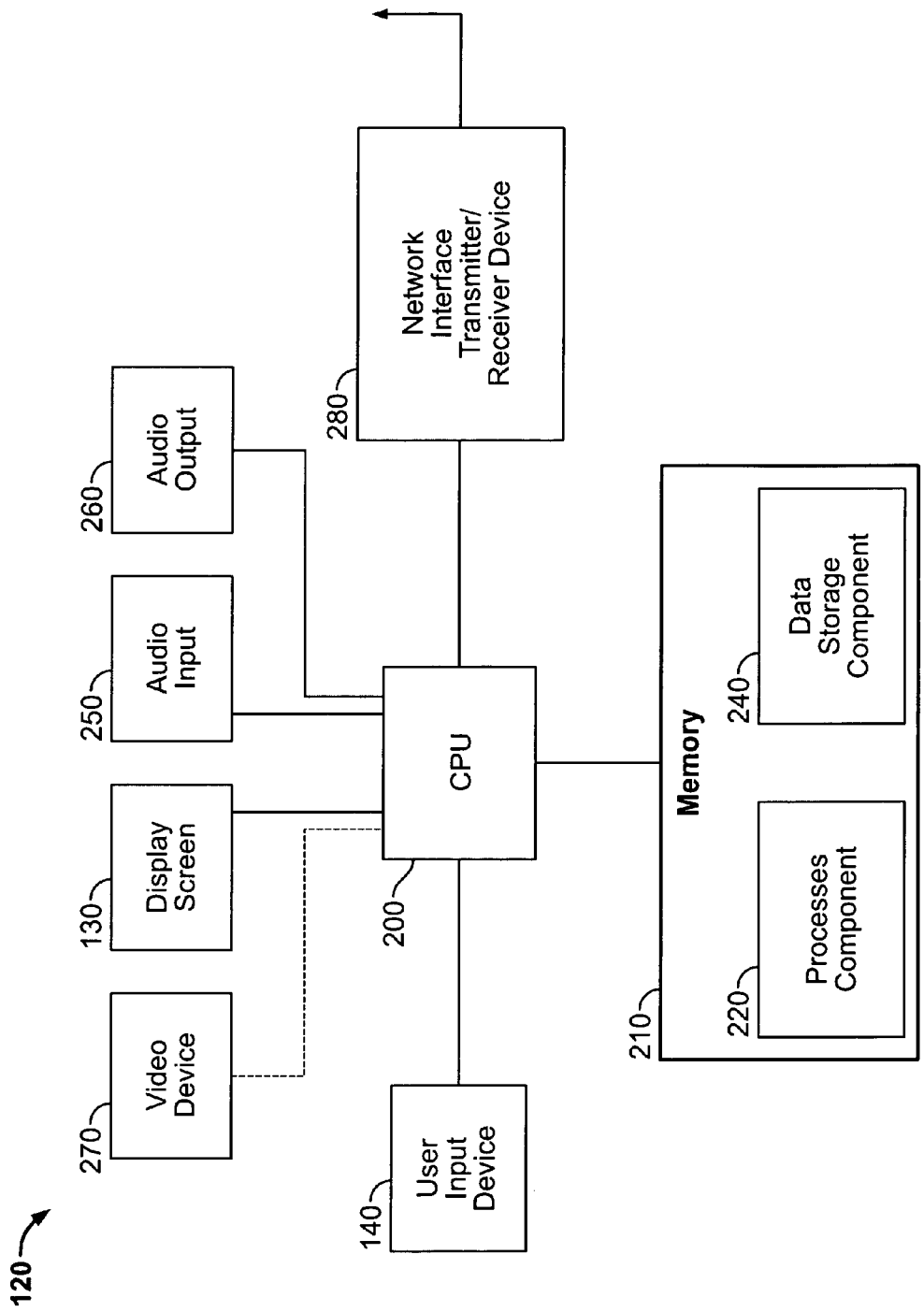
FIG. 2 is a block diagram of the hardware components of the network communication devices of FIG. 1.

Referring now to FIG. 2, a block diagram illustrating the hardware components of one embodiment of a network communication device 120 is shown. In this example, network communication device 120 is a microprocessor-based unit having central processing unit 200 coupled with an associated memory component 210. Memory component 210 comprises processes component 220 and data storage component 240. Processes component 220 may store the software-based processes that are executed by the central processing unit 200 in performing various operations and tasks by the network communication device 120. For instance, core application process 300 (shown in FIG. 3), and its associated sub-processes may be stored in data storage component 240 and executed at the processes component 220 in memory 210. Data storage component 240 also stores user capabilities of the network communication devices in the network; updated online user lists, IP addresses, labels for user names and security information.

With continuing reference to FIGS. 1 and 2, one or more user input devices 140 coupled with central processing unit 200 are employed to initiate actions and input or modify information that may be displayed at display screen 130 of the network communication device 120. For example, a keyboard, keypad, mouse or any other computer input device may be used for interaction with a graphical user interface appearing on the display screen 130 during user operation of the network communication device 120. An audio input 250, such as a microphone, and audio output 260, such as a speaker, are coupled with central processing unit 200 to provide audio functionality at the network communication device 120. A video device 270, such as video camera, digital video recorder or cell phone with video capabilities may be connected with the network communication device 120 for video transmission to other devices in the network 100. Video output is displayed at the display screen 130 via graphical user interface during video communication through the network.

Network interface 280 is coupled with central processing unit 200 for the transmission and receipt of voice, video and data communication signals with the network communication devices 120 (and other node devices) of the network 100. Network interface 280, for example, may be but not restricted to, a TCP/IP compatible transmitter and receiver communication device, a universal serial bus device or an Institute of Electronics and Electrical Engineers (IEEE) Standard 802.11 compliant memory card for transmitting and receiving data in packets to and from other network communication devices in the network. For example, a WMC6300 model wireless modem memory card sold by Motorola, Inc. may selectively be employed at the network communication devices 120.

Figure 3:
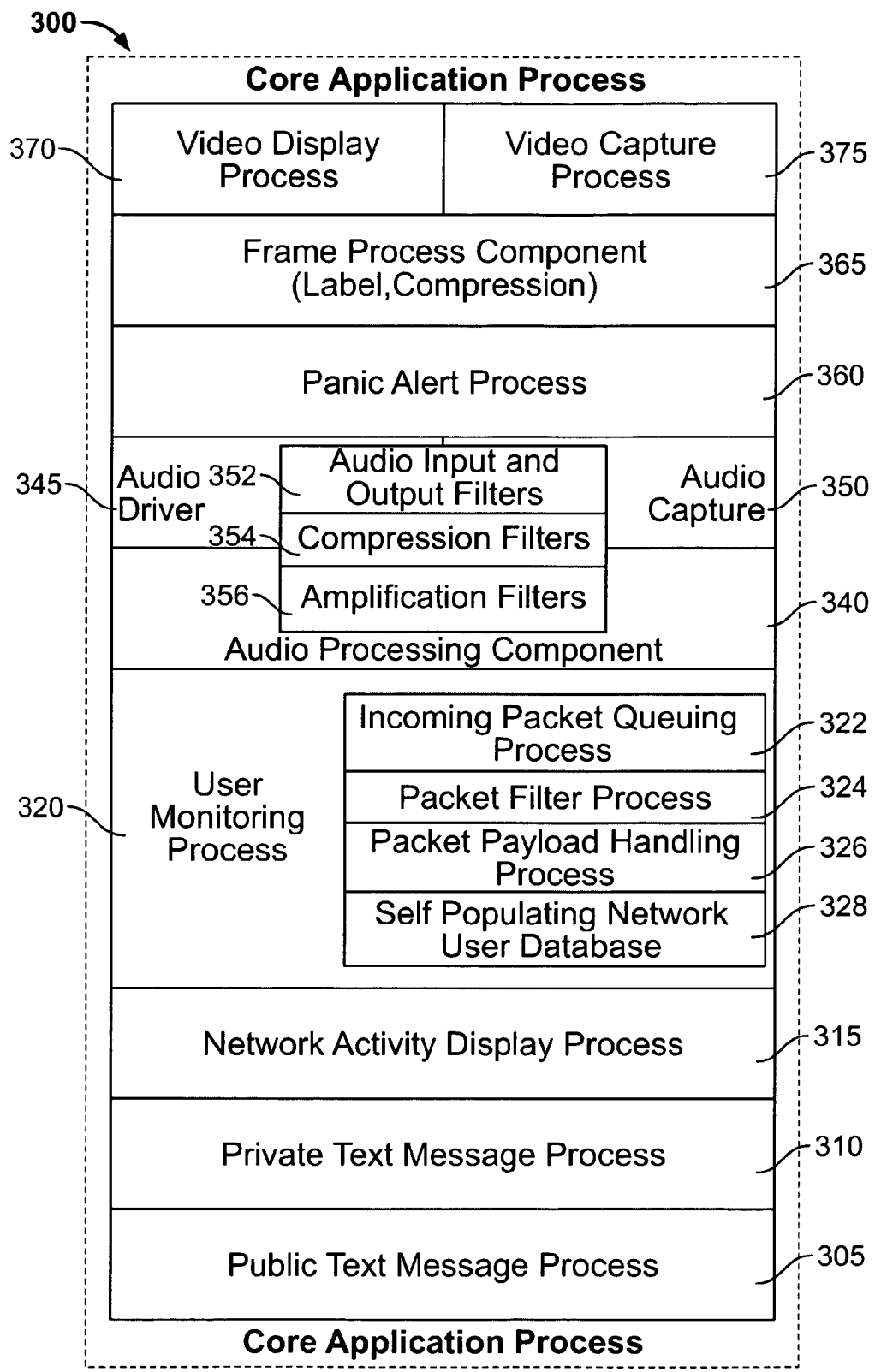
FIG. 3 illustrates software components in a layered format for a network communication device.

The software used with the system, referred to generally as core application process 300, is shown in FIG. 3. Core application process 300 is resident on the network communication devices 120 (FIG. 1) that form the wireless network 100. Core application process 300 is an encrypted software tool that enables secure collaboration with users on the network. An advanced encryption standard (AES) at 128 bit is provided for security at the network communication devices 120 with auditing capabilities of various communications such as: chats, instant messages, file transfers, video and audio. Voice, video and data communication may occur over the local area network. Network communication devices 120 are able to communicate online using standard Internet and other network protocols in wired, wireless, or hybrid network environments. Communication may selectively be performed with or without a centralized server.

FIG. 3 illustrates the software-based components of core application process 300 in a layered format. As shown in FIG. 3, the various software-based components of core application process 300 are structured in a framework such that each process is separate but linked together through the sharing of common data and services so that each process can run at the same time and failure of one process will not cause failure of another. Core application process 300 establishes video, voice and data communication between the network communication devices 120 of FIG. 1 in mobile wireless network 100. The core application process 300 resides in the processes component 220 shown in FIG. 2, in memory 210 for the individual network communication devices 120 that form the mobile wireless network 100.

In an exemplary embodiment, voice, video and data communication functionality are performed by various software-based components of core application process 300. For instance, data communication in the mobile wireless network may be performed by public text message process 305, private text message process 310, network activity display process 315, and user monitoring process 320. Public text message process 305 performs the processing related to public chat in which text messages are communicated to all network communication devices 120 that are online in the network 100. The private text message process 310 performs the processing related to private chat communications in which text messages are sent between two network communication devices 120, but are rejected and not seen by the network communication devices of other users. Network activity display process 315 displays the status of current and recently known network communication devices 120 within the network. User monitoring process 320 performs the processing related to the self-configuring online user lists that are stored and updated in the data storage component 240 (FIG. 2), in memory 210.

In addition, various sub-processes may be employed in developing the self-configuring user list of online network communication devices. Incoming packet queuing process 322 places packet information that is received at the network communication device in queue. Packet filter process 324 inspects and rejects invalid packets. Packet payload handling process 326 parses information in each packet and provides individual data to the appropriate other process components of the core application process. Additionally, network self-populating user database 328 is provided at the data storage component 240, FIG. 2, in memory 210 for persisting individual user data, and ages/deletes information at appropriate intervals.

Voice communication functionality is handled by the audio processing component 340. Audio driver 345 handles actions relating to the transmission of audio information to remote network communication devices 120. Audio capture 350 performs the processing related to the receipt of incoming audio information received at the network communication device from remote devices in the network. Audio input and output filters 352, compression filters 354 and speaker amplification filter 356 are utilized for executing audio functionality for the network communication device. Specifically, audio input filter 352 receives data from audio device driver and passes it through filter 356, which calculates the amplitude of the signal. Data within amplitude limits may be passed along to compression filter 354 and over the network to a remote device in the form of a raw TCP stream.

Figure 4:
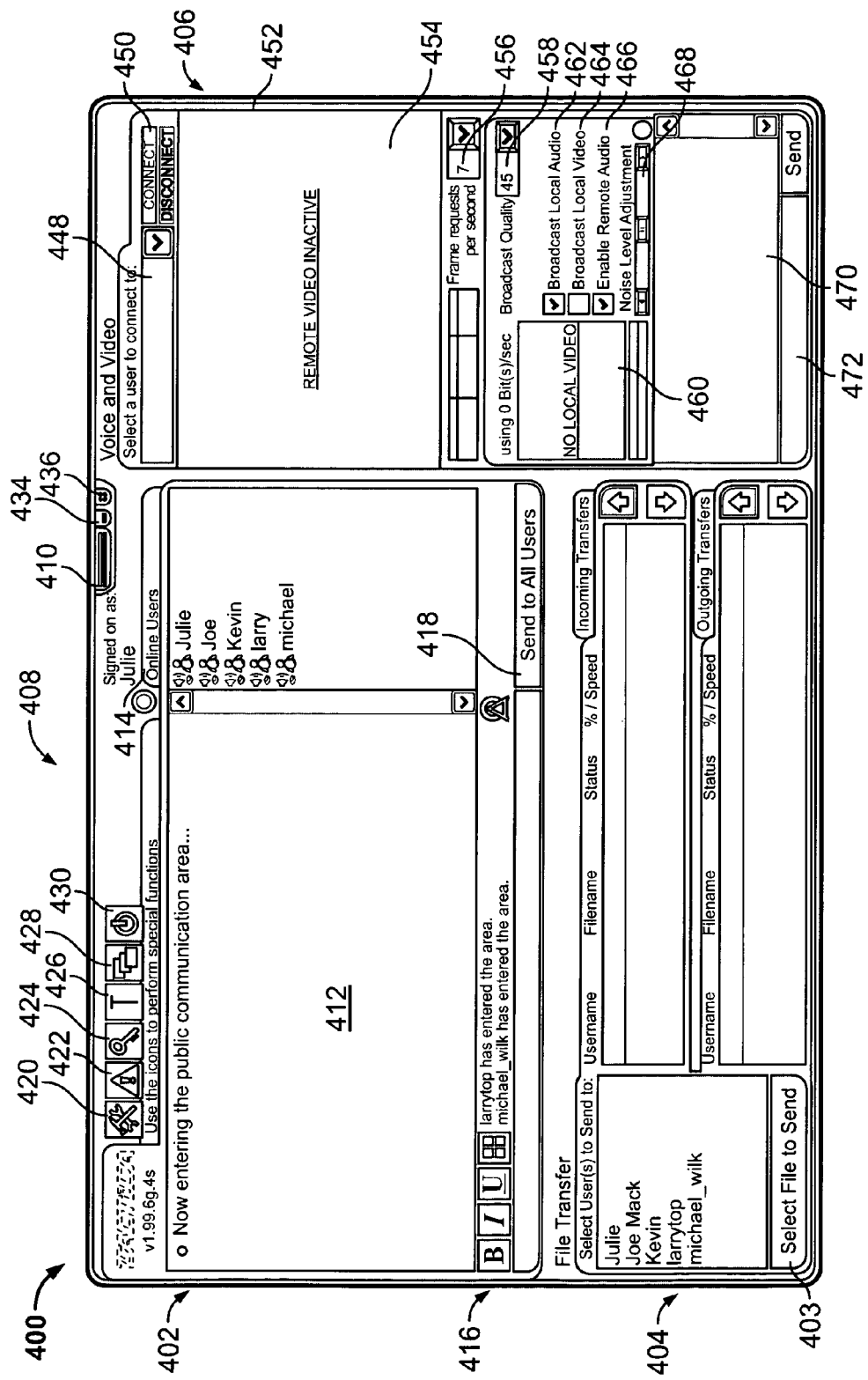
FIG. 4 is a screen display of a graphical user interface displayed at a network communication device.

Panic alert process 360 is provided as part of the core application process 300 to provide a panic alert display message and audio signaling to each of the remote network communication devices upon user activation of a panic icon 422, displayed at user interface 400, shown in FIG. 4.

Core application process 300 further comprises frame process component 365 for the labeling and compression of frames for video display. The frame process component 365 regulates the number of frames per second sent and/or received to permit optimum viewing when limited network or client computer resources are available.

Video communication is further provided between the network communication devices 120 through video display process 370 and video capture process 375. The video display process 370 handles the processing relating to the display of video images at a network communication device that are received from remote devices in the network. The video capture process 375 handles the processing related to obtaining video at the network communication device 120 for transmission and display at the remote network communication devices in the network.

Related to the layers of core application process 300 are an operating system services layer and various device drivers. Operating system services layer opens and closes sockets to pass data to device drivers (not shown). Device drivers allow the operating system and/or other applications to communicate with connected hardware device, such as a camera, a speaker or a memory card.

With continuing reference to FIGS. 1-4, formation of network 100 occurs when various users with network communication devices 120 access the network and the network communication devices send a network participation packet to the other network communication devices. The term network participation packet, as used herein, means a packet of information transmittable between the various devices within a network to indicate the presence or participation of said devices within the network. The core application process 300 functions in the network 100 through the use of a discovery engine that locates active network addresses listening on a configured port in accordance with the algorithm set forth in FIG. 6.

Figure 6:
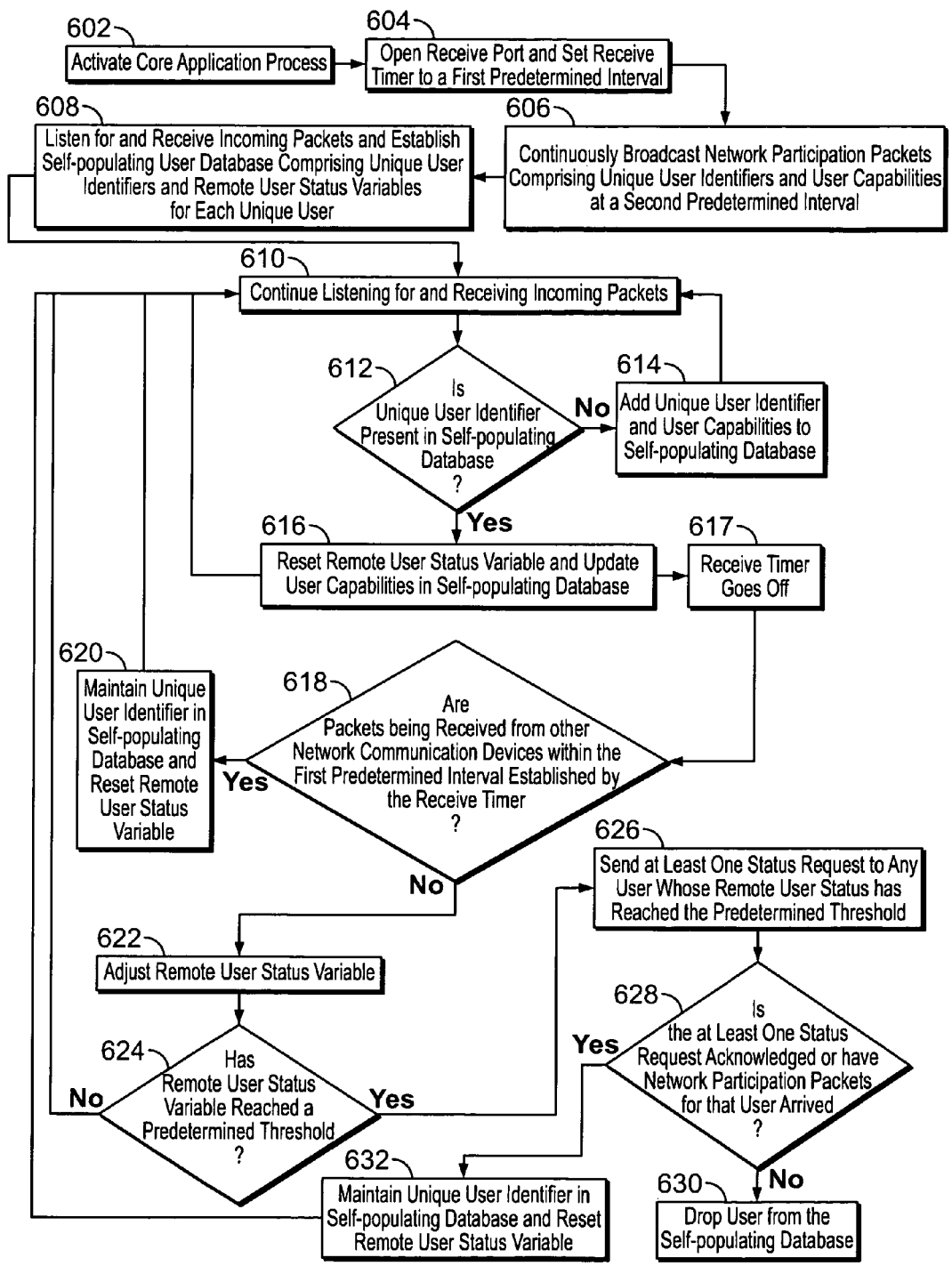
FIG. 6 is a flow chart illustrating the steps of establishing a self-configured user list.

FIG. 6 is a flow chart illustrating the establishment and maintenance of a network in accordance with one embodiment of the present invention. In general, once each user enters the network area, user monitoring process 320 sends network participation packets over a user datagram protocol ("UDP") at regular predetermined intervals to other network communication devices 120 within the network 100; the packets are received, examined and acknowledged.

Figure 7:
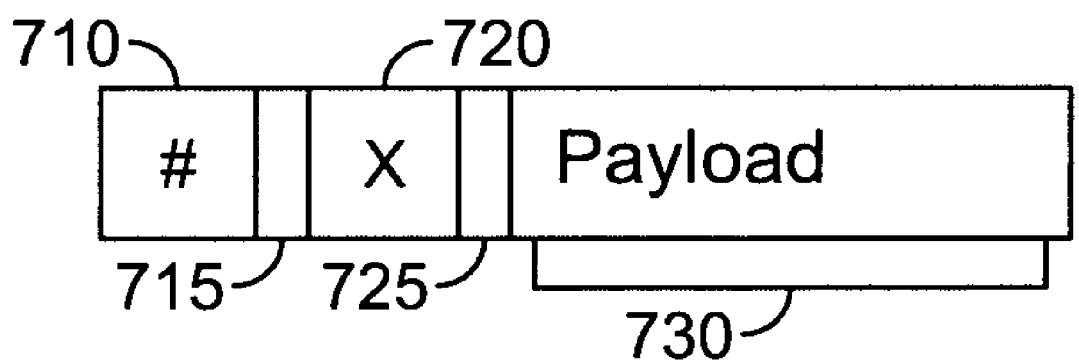
FIG. 7 is a representation of a network participation packet.

As an initial matter, the packets are generated through translation of a network address (associated with each user) into a user name. An example representation of a packet, shown in FIG. 7, comprises user-specific packet identification integer 710, typically comprising a 16 character string, which may be the Internet protocol address (IP address) of the unique user followed by an integer, separators 715 and 725, payload type identifier 720, typically in the form of a letter designating the payload type (e.g., m=broadcast message) and payload 730, comprising the unique user identifier for each user and medium access control address or MAC address and the packet being sent. Payload 730 may further comprise all known IP addresses for the user, the status of audio and video capabilities for each unique user (i.e., whether the network communication device for each user is presently accepting and sending audio and/or video) and whether the user is a participant in a sub-group private chat.

Referring to FIGS. 3 and 6, network communication devices 120 establish and maintain a network by repeatedly sending the aforementioned packets to a specified port. Specifically, in step 602 the core application process 300 is initiated. In step 604, the specified port for the user is opened and a packet receive timer is activated. Packet receive timer is set to a first predetermined interval according to the expected duration between receipt of network participation packets from each of the various network communication devices within the mobile wireless network.

Establishment of the wireless network communication application begins with a broadcast of network participation packets from the network communication devices 120 of all users who have initiated the core application process. In step 606, network communication packets, each of which comprise unique user identifiers and user capabilities, are continuously broadcast to open ports in other network communication devices 120 at a second predetermined interval. The second predetermined interval may or may not equal the first predetermined interval. In step 608, the various network communication devices 120 listen for and receive incoming packets from the other network communication devices 120. Upon receipt of same, packet filter process 326 and packet payload handling process 326 process the packet and a self-populating user database comprising the unique user identifiers is established. The self-populating user database may further comprise remote user status variables associated with each user associated with a network communication device. The term remote user status variable, as used herein, means any variable adjustable according to whether network participation packets are being received at the first predetermined interval set in the receive timer. For example, the remote user status variable may selectively be an integer between 0 and 6.

Once the self-populating database is established, the various network communication devices within the network continue to listen for and send the packets. In step 610, each network communication device continues listening for and receiving incoming network participation packets. In step 612, user monitoring process 320 ascertains whether incoming network participation packets already reside in the self-populating database. If the sending user is previously unknown to the receiver, in step 614 the core application process 300 for the receiving device adds the name and address of each user to its self-populating network user database 328 and populates its online user list with the configured name for the sender along with user capabilities. If the user name is already present the receive timer is reset and user capabilities are updated in step 616. In step 617, network participation packets are not received at the first predetermined interval and the receive timer goes off.

With network connectivity established, maintenance follows. In step 618, user monitoring process 320 for each network communication device 120 checks to see whether network participation packets are being received from each unique user within the first predetermined interval established by the receive timer. If so, in step 620, the self-populating database maintains the appropriate unique users and the remote user status variables for the users are reset. If not, in step 622, the remote user status variable for the users whose network participation packets were not received is adjusted. The remote user status variable, for example, may be increased by one each time a network participation packet is not received from a given user within the first predetermined interval.

If the remote user status variable reaches a predetermined threshold, shown in step 624, further action is taken. For example, if the remote user status variable=3 (e.g., three consecutive expired receive timers without receipt of a network participation packet from the same unique user), status requests may be sent. In step 626, at least one status request is sent to each network communication device whose remote user status variable has reached the predetermined threshold. In step 628, user monitoring process 320 for the sending network communication device ascertains whether the status request acknowledged or network participation packets for the non-responsive unique user have been received. For example, three status requests may be sent at five second intervals. In the absence of a response all three status requests or arrival of a network participation packet from the non-responsive user, in step 630, the unique user identifier for that user is dropped from the self-populating database and the user no longer appears on the display screens of the network devices for the other users. A customized message may thereafter appear on all remaining network communication devices 120 stating "<<configured user name>> has left the area". If a response is made, in step 632, the name of the user is maintained in the self-populating user database and the remote user status variable is reset. In this way, core application process 300 is able to auto-discover and auto-populate online user lists.

After wireless network formation, users may communicate through graphical user interface 400 that appears at the display screen 130 of each network communication device 120. One embodiment of graphical user interface 400 is shown at FIG. 4. User interface 400 comprises three main activity areas or modules, including (1) chat/instant message activity area 402 for engaging in text based discussions and sending and receiving instant messages, (2) file transfer activity area 404 for transferring files to and from other network communication devices and (3) voice/video chat activity area 406 for sending and receiving live audio and video.

A key component of team centered missions and tactical deployment is ensuring that everyone has correct information and applies it at the right time and place. Chat/instant message activity area 402 displays text based messages to network users or select network users as well as the identity of users within the network. Chat/instant message activity area 402 includes toolbar 408 navigation bar 410, text message area 412, online user list 414, text attribute buttons 416 and send to all users button 418. Core application process 300, shown in FIG. 3, automatically inserts a MAC address or a name selected by the sender into online user list 414.

Toolbar 408 includes icons for enabling various features, including settings icon 420, panic icon 422, sub-group chat icon 424, desktop program icon 426, docking/undocking icon 428, and exit icon 430. Setting icon 420 allows users to alter settings, including, for example, chat, video and name display settings. Panic icon 422 sends a panic alert message to other users at network communication devices. Sub-group chat icon 424 allows formation of a sub-group of network communication device users who can engage in a confidential chat. Desktop program icon 426 allows users to open other programs, such as Microsoft Word. Dock/undock icon 428 allows users to combine and separate the three activity areas. Exit icon 430 shuts down the core application process.

Navigation bar 410, which may be located on each of the three activity areas, allows users to move the activity areas to other areas of the display screen. A network communication device user clicks on undock/dock icon 428 and uses navigation bar 410 to drag each activity area to the desired location of the display screen. Additionally, navigation bar 410 can be used to minimize user interface 400 to work on other software programs, by clicking on minimize button 434. Navigation bar 410 also allows users to close user interface 400 by clicking on terminate button 436.

When a user enters the network, the name of the user, along with other user names, appear in online user list 414. The name of the user also appears next to text attribute buttons 416, along with a message indicating that the user has now entered the mobile wireless network. If a user is idle (i.e., doesn't touch his or her mouse or keypad), user name is italicized. When a user leaves the mobile wireless network, his or her name will "gray out" or disappear from online user list 414.

Chat/instant message activity area allows both chatting and instant messaging. Chatting allows several network users to simultaneously and confidentially communicate using text-based messages. Chatting takes place in text message area 412. Instant messaging enables two network users to carry on a live private conversation in a pop-up window. A user datagram protocol ("UDP") typically broadcasts command sends text-based messages to the other network communication devices 120 in the wireless network 100.

Figure 8A:
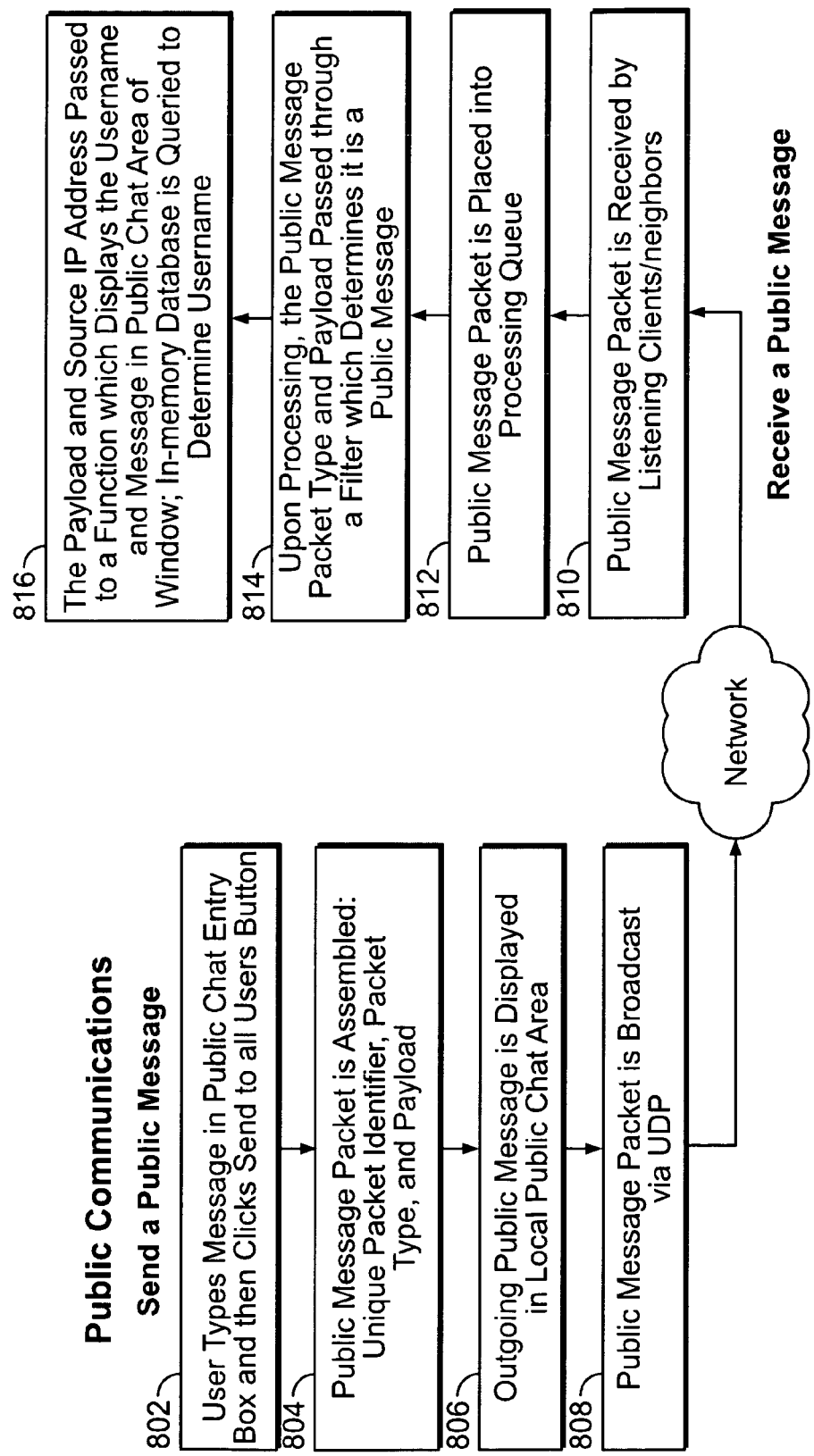
FIG. 8A is a flow chart illustrating the steps performed for public communications by the core application process.

The process for engaging in chatting by sending public messages is displayed at FIG. 8A. In step 802, a user types the message in text message area 412 and clicks send to all button 418. In step 804, a public message packet, comprising a unique packet identifier, packet type and payload, is assembled. In step 806, the public message is displayed in the local text message area for the sender and then, in step 808, broadcast via UDP through the network. In step 810, the public message packet is received by listening network communication devices 120 and placed into incoming packet queuing process 324 in step 812. In step 814, the packet is processed by passing it through packet filter 324 and packet payload handling process 326. Once it is determined that the packet comprises a public message, in step 816, the payload and IP address for the sender are passed to a function that displays the username and message in text message area 412 of all users.

Figure 8B:
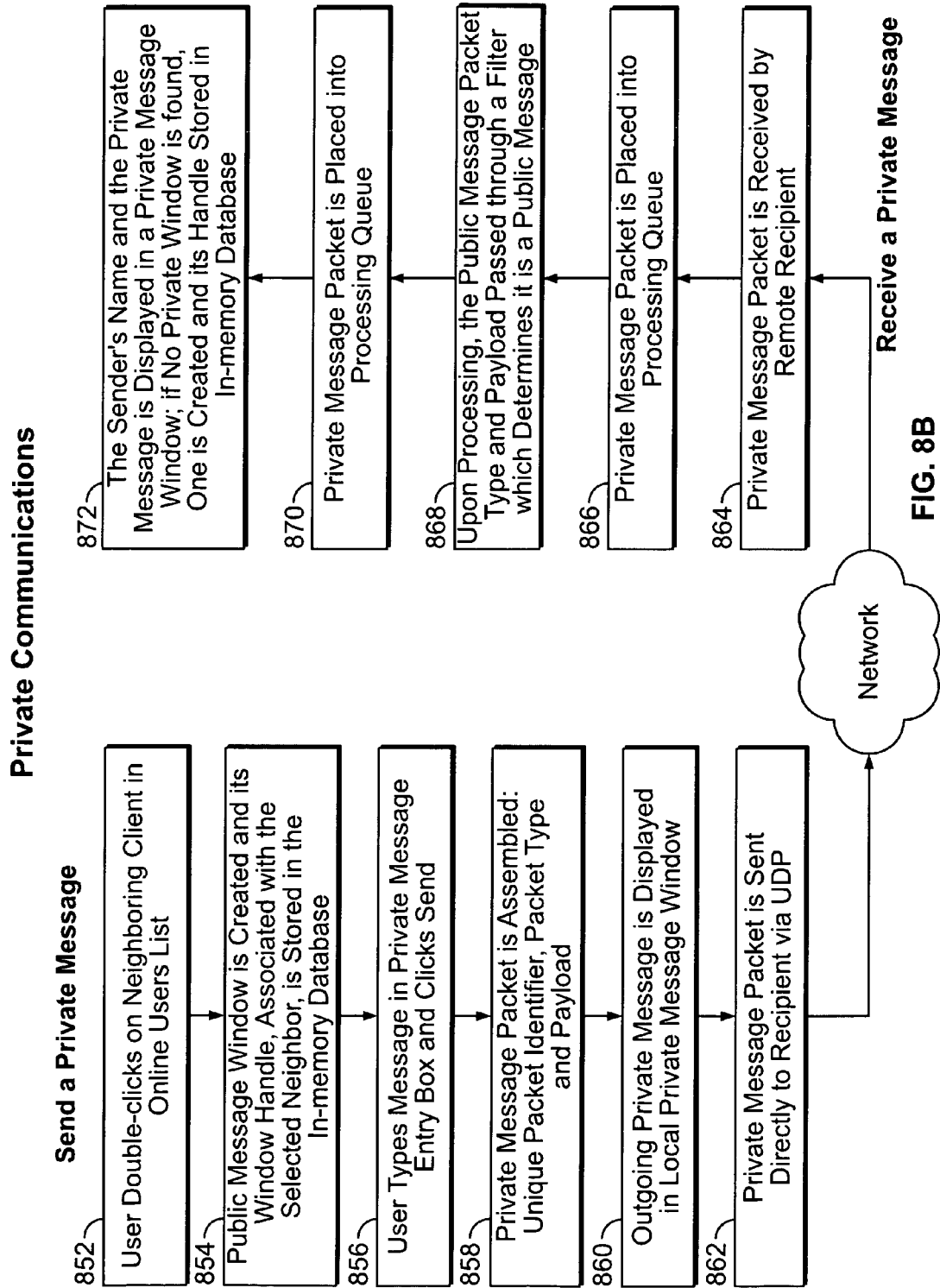
FIG. 8B is a flow chart illustrating the steps performed for private communications by the core application process.

The process for instant messaging, with private message, is displayed at FIG. 8B. In step 852, a user clicks on a neighboring user in the in online users list 414. In step 854, a private message window appears and the identity of the neighboring user is stored in an in-memory database. In step 856, the user types a message in the private message entry box and clicks send. In step 858, a private message packet, comprising a unique packet identifier, packet type and payload, is assembled. In step 860, the outgoing message is displayed in the local message window of the sender and is sent directly to remote user, via UDP for example, over the network in step 862. In step 864, the private message packet is received by the remote user and placed into incoming packet queuing process 322 in step 866. In step 868, the packet is processed by passing it through packet filter 324 and packet payload handling process 326. In step 870, the packet is placed into a processing queue. In step 872, the name of the sender and a private message are displayed in a private message window. If no private message window is found, one is created and the identity of the sending user is stored in memory. To end an instant messaging session, a user simply clicks on the close button in the upper right hand corner of the private message window. Of course, more than one instant message conversation can take place at the same time. Clicking several network user names in the online user list generates several private messaging windows.

The difference between public chatting and private instant messaging is that the chat function is for public group conversations of two or more people and instant messaging is for private conversations between two people only. Depending on the circumstances, users can employ both at the same time or one or the other. In either case, to ensure confidential communication, messages are encrypted when sent.

A sub-group of network users may also be formed by using sub-group icon 424. Members of the sub-group can participate in a private or "privileged" group chat, at the same time they are chatting with all other members at network communication devices 120 of the network 100. Importantly, network communication device users who are not part of the sub-group are unable to view or respond to the messages being exchanged by the sub-group even though both chats are taking place in the same chat area at the same time. The network communication device users in the sub-group can, however, view both general and private messages being exchanged.

In a default mode, all authorized network communication devices 120 can send, receive, and display all chat room communications. The core application process 300, FIG. 3, further enables each network communication device to act as a "team leader device" to have additional control over which devices can communication with each other. Activation of this control to establish sub-groups, in one example, is performed via a password prompt, accessed through the user interface.

Once the password is entered into a network communication device 120, that device acts as a team leader device. The password unlocks and activates a dual-communications mode in the team leader device. This dual-communications or sub-group mode enables the team leader device to operate in the default "open" communications mode and in a secondary "restricted" communications mode. In addition, it also allows the team leader device to activate the dual-communications or sub-group mode in other user-specified network communication devices running the core application process.

Activation of sub-group mode occurs when a network communication device user clicks on sub-group icon 424 and selects a group of individuals from online user list 414. Chat/instant message activity area 402 thereafter displays each selected user name in bold, but only to members of the sub-group and not other network users. When the sub-group first forms, a message is displayed in the text message area 412 of each recruited network user informing them they are now part of the sub-group. After sub-group formation, the chat/instant message activity area 402 for each recruited user changes to accommodate sub-group members. Instead of a single send to all users button 418, a to privileged users button 438 also appears. Clicking on these buttons determines which users will have access to text-based messages. Text-based messages sent between sub-group members also change. These private messages may be displayed in bold red between brackets [ ]. This identifies which messages are sent to all network communication device users as opposed to just the selected group.

Figure 8C:
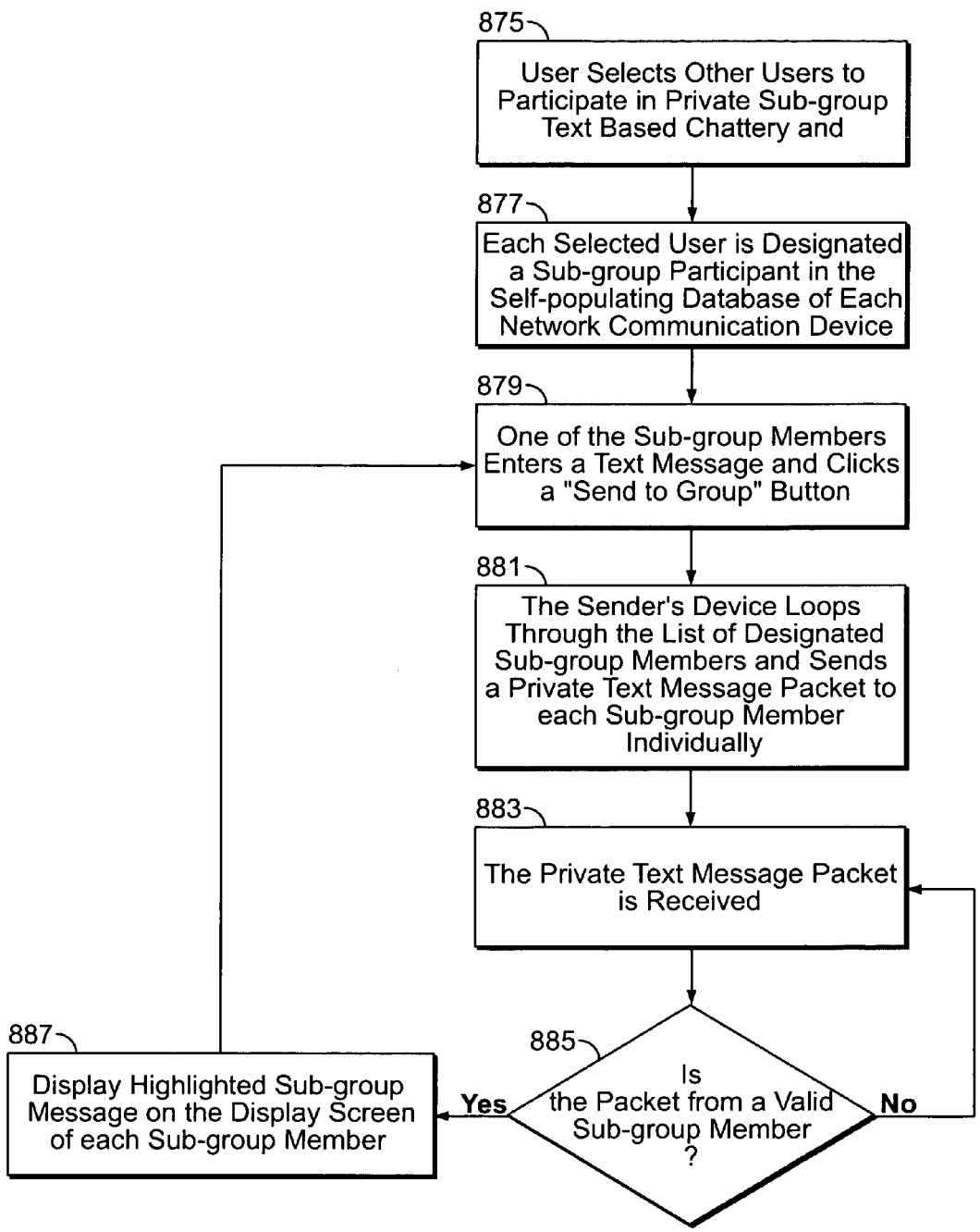
FIG. 8C is a flow chart illustrating the steps performed for private sub-group communications by the core application process.

FIG. 8C is a flow-chart illustrating the steps for private sub-group messaging. In step, 875, a user selects one or more users to participate in private sub-group chatting. In step 877, the selected sub-group members are designated in the self-populating database of the network communication device 120 for each user within the group. A send to group button appears almost immediately thereafter on each of the display screens for the sub-group members. In step 879, one of the sub-group members enters a text message and clicks on the send to group button. In step 881, the sender network communication device loops through the self-populating user database and individually sends a sub-group message packet to each sub-group member designated in the self-populating user database. In step 883, the incoming sub-group message packet is received and processed. Private text message process, in step 885, checks to see whether the command group message packet emanated from a valid sub-group member. If so, in step 887, the text message appears in highlighted form in the text message area 412 of the sub-group members only. In this way, the sub-group members can view public text-based messages at the same time as private sub-group messages in the same activity area.

Sharing information is important to effective communication between network users. File transfer activity area 404 enables network communication device users to transfer any properly formatted data over the network 100, including text based files, photos, video clips and audio clips. File transfer activity area 404 may comprise file transfer user list 440, file select icon 442, incoming file transfer area 444 and outgoing file transfer area 446. File transfer is synchronous. In addition, files may be sent and received at the same time, by one network user or several network users.

Figure 9:
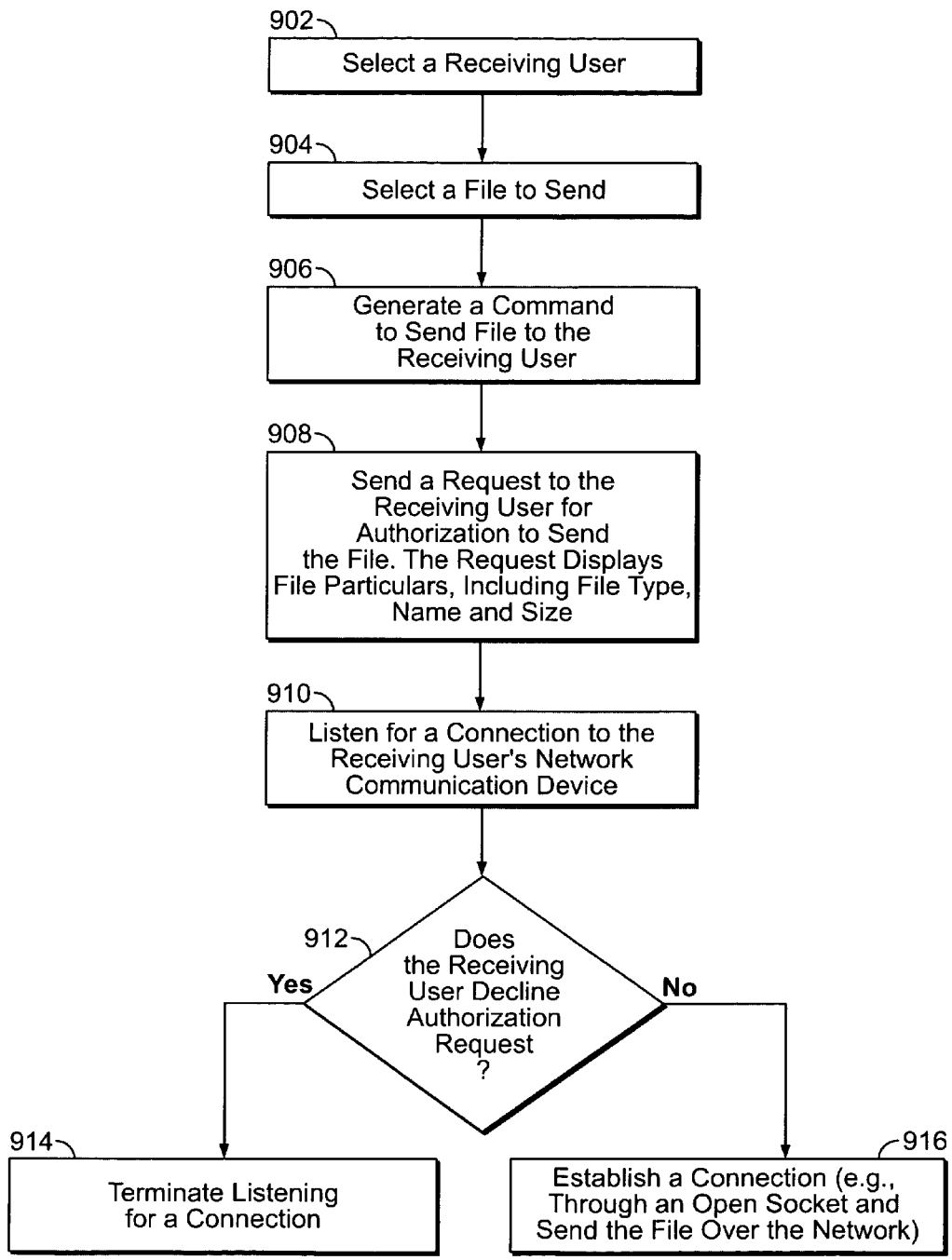
FIG. 9 is a flow chart illustrating the steps performed for file transfer between network communication devices.

The process for accomplishing file transfer is shown in FIG. 9. Once a user operating a network communication device 120 decides to send a file to another user in the network, in step 902, the sending user at a network communication device 120 selects a receiving user by single clicking on the user name(s) in file transfer user list 404. In step 904, the sending user selects a file to send by clicking on select file to send icon 403, which opens folders with various files to send to receiving user(s). The sending user selects a file by clicking on it. In step 906, the network communication device 120 for the sender generates a command to send the file to the receiving user. The receiving user can decide whether to accept or decline file transfer. In step 908, the network communication device 120 for the sending user forwards a request to the IP address corresponding to the identification number associated with the remote user, requesting authorization to send the file. The file particulars, including file size and name, are shown to the receiving user during the request for authorization. In step 910, the network communication device 120 for the sender listens for a connection to the receiving network communication device. In step 912, the receiving device indicates whether the user will accept or refuse the authorization request. If the receiving user declines the authorization request, the network communication device for the receiving user generates and sends a decline message to the network communication device for the sender, which, in step 914, causes the sender device to terminate listening for the connection. If the user accepts the request, in step 916, the network communication devices 120 connect, typically through an open socket connection, and the file is sent over the mobile wireless network 100 through the socket.

Figure 10:
FIG. 10 illustrates a panic alert screen for display at a network communication device.
Figure 11:
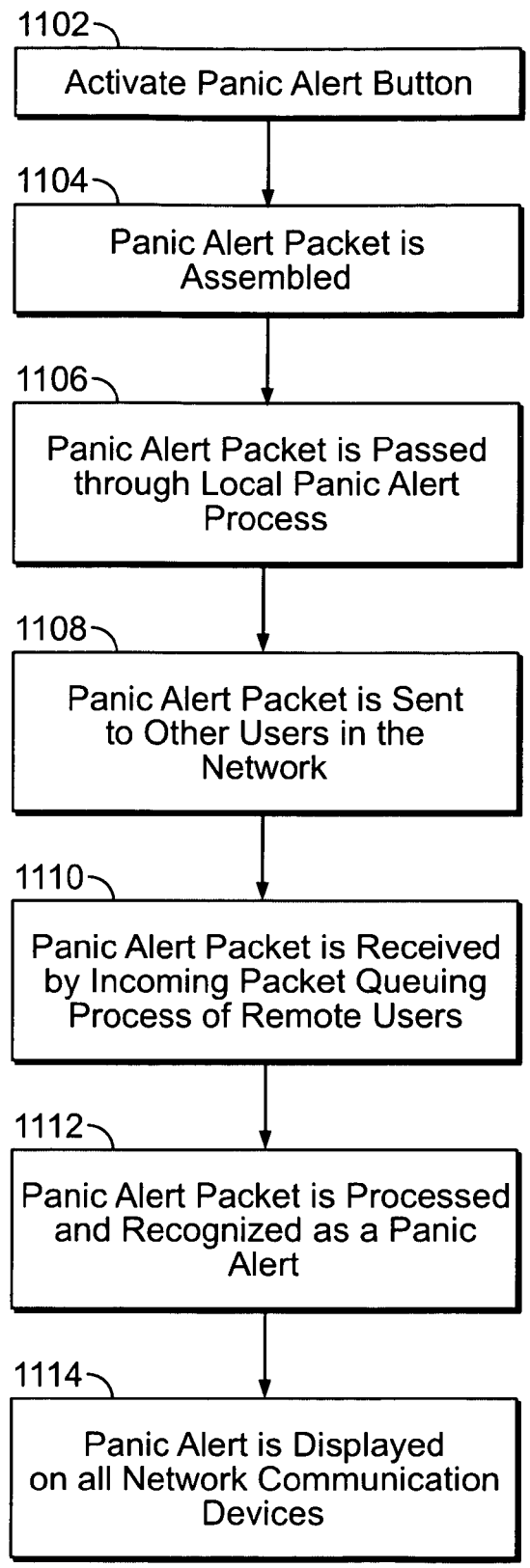
FIG. 11 is a flow chart illustrating the steps performed for issuing a panic alert.

In the event a network user encounters trouble or an emergency, panic icon 422, shown in FIG. 4, can be employed to alert other network users. The process for issuing a panic alert is shown at FIG. 11. In step 1102, a user activates the panic alert button, which in step 1104, causes assembly of a panic alert packet, comprising user name, IP address, packet type and payload and a predetermined character corresponding to a panic alert screen. In step 1106, the panic alert packet travels through the panic alert process 360 at the sender network communication device, which, in step 1108, recognizes it as such and sends it along to the other network communication devices 120 in the network 100. Once the panic alert message is received, in step 1110, it travels through the incoming packet queuing process 322 of the receiving user. In step 1112, the packet is processed in packet filter process 324 and packet payload handling process 326, where it is recognized as a panic alert. The moment the panic alert packet is recognized, in step 1114, a panic alert display is displayed. A panic alert is shown at FIG. 10. As shown in FIG. 10, panic alert display comprises a transparent red screen, name of the issuing user, IP address and the words "panic alert" in bold. Other users may acknowledge the panic alert by clicking on the screen, which removes the panic alert display.

Having the capability to send and receive audio and video data to and from any network communication device 120 user is also helpful to orchestrating and executing team oriented tasks. The network communication device enables peer to peer communication through voice/video chat activity area 406, shown in FIG. 4. Audio communication is accomplished through a continuous stream of data over a consistent connection while video communications involve sending of discreet packets or bursts of information. Since audio and video rely on different data streams, network communication device users can connect to one without the other. In addition to communication between remote network communication devices, cameras or microphones may be placed in remote connections and connected to the network, thereby allowing monitoring of predetermined areas for safety and other purposes.

Referring again to FIG. 4, voice/video activity area 406 comprises remote user video and audio selector 448 and connector 450, remote user video display area 452, remote user audio confirmation indicator 454, frames per second indicator 456, broadcast quality selector 458, operating user camera display area 460, operating user audio and video enablers 462 and 464, remote user audio enabler 466, noise level adjuster 468, video chat window 470 and video chat message box 472 for sending text-based messages. As discussed hereinafter, video and audio selector and connector 448 and 450 are used to establish a connection with a remote network communication device 120, FIG. 1. Remote user video display area 452 and remote user audio confirmation indicator 454 display video and confirm audio emanating from users stationed at remote network communication devices 120.

Sending user audio and video enablers 462 and 464 and remote user audio enabler 466 may be used to start and stop audio and video transmission after connection. If sending user audio and video enablers 462 and 464 are not check marked, then connected remote users cannot receive audio and video because transmission will not occur. If remote user audio enabler 466 is not checked, the user will not be able to hear the audio stream from a remote user. To disable audio but not video, an operating user may simply uncheck remote user audio enabler 466.

The quality of video is dependent on several factors, including available bandwidth, frames per second and broadcast quality setting. The network communication device 120 automatically adjusts for these factors. Direct control of video quality, however, can also be achieved through adjustments to frames per second indicator 456, which adjusts the number of sequential framer requests the operating network communication device 120 requests from the video stream from a remote network communication device. Additionally or alternatively, the operating user may contact the remote user to request adjustments to the broadcast quality indicator 458. Noise level adjuster 468 provides fine-tuning for audio broadcasts to remote network communication device users. That is, noise level adjuster sets the amplification level the network communication device 120, FIG. 1, accepts for transmission to other network communication devices in the network.

Video chat window 470 has a similar operation and functionality as the main chat activity area 402, except that video chat is only open to network communication device users with video connections. Video chat allows network communication device users connected by video (i.e., if an operating user is connected to a remote user or other multiple network users are connected to an operating user) to discuss video being viewed. This is particularly useful if audio is disabled.

Figure 5A:
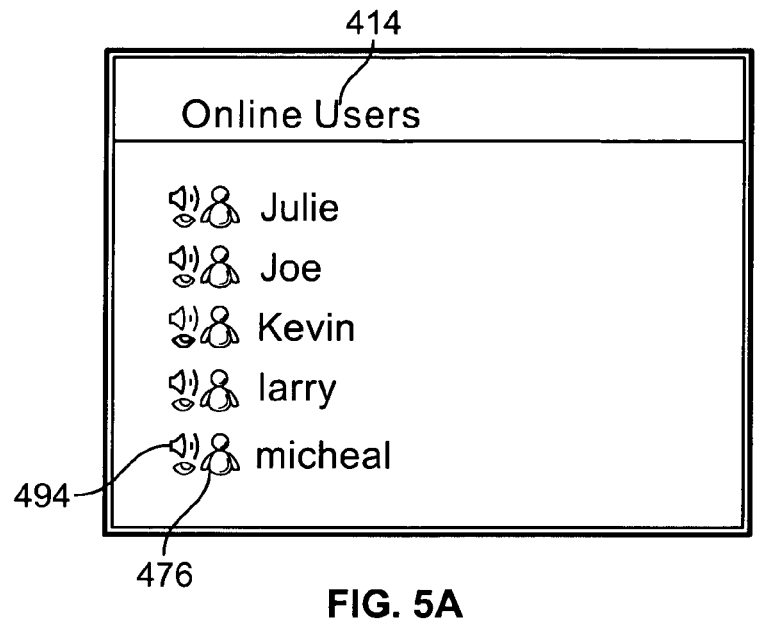
FIG. 5A is a list of online users, as they may appear in the graphical user interface of FIG. 4.
Figure 5B:
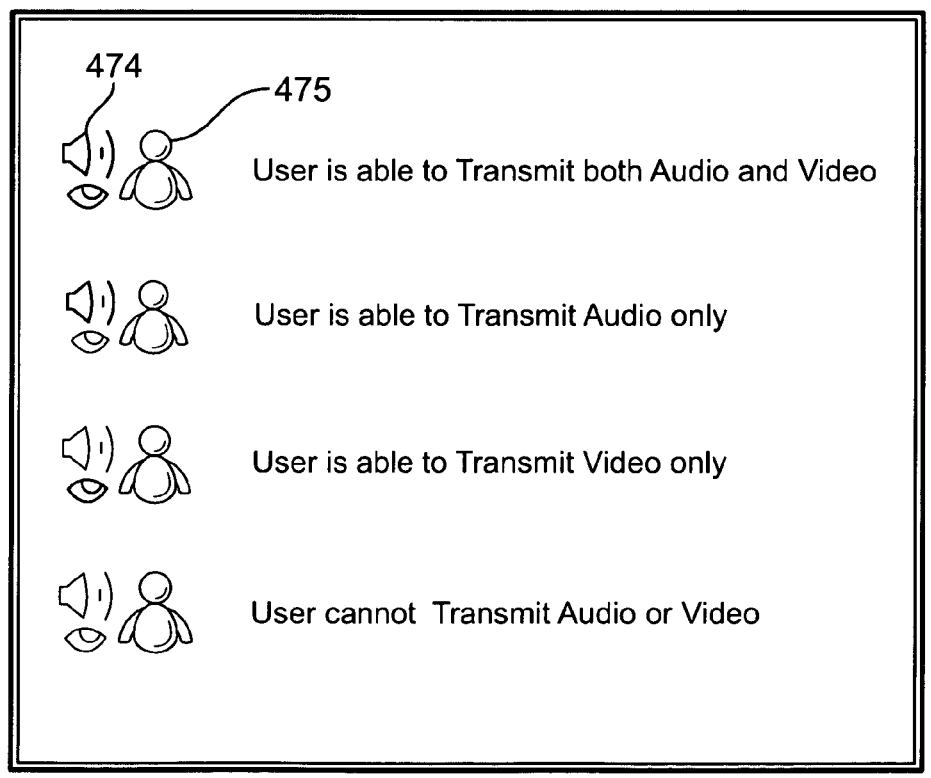
FIG. 5B is a representation of icons for audio and video, as they may appear in the graphical user interface of FIG. 4.

As shown in FIGS. 4, 5A and 5B, online user list 414 indicates which users can send and receive audio and video feed, with eye 474 indicating video capability and speaker 476 indicating audio capability. A bolded eye 474 and speaker 476 indicate video and audio capability and a greyed-out or phantom eye 474 and speaker 476 indicate that the audio and video for the user are unavailable. To enable or disable audio and video, a user interacts with audio and video enablers 462 and 464. After checking or unchecking enablers 462 and 464, the status of audio and video capabilities for a given user are updated on other network communication devices upon receipt of network participation packets. Data storage component 240 (FIG. 2) of the network communication device 120 is checked to ascertain existing capabilities. Depending on the message, a variable within data storage component 240 is changed to either enable or disable audio or video, thereby updating user capabilities in the network participation packets for that unique user. The network participation packet is broadcast to other users within the network for updating on the recipient's users list.

To establish audio or video communication, a compatible audio input device or video input device, for example a microphone or camera, may be connected to the network communication device 120. To initiate an audio or video connection, the requesting user reviews online user list 414 to ascertain which users have audio and video capability. In step 1202, one user selects another from audio video selector 448. Once the requesting user clicks connector 450, both audio and video connections automatically occur, unless enablers 462, 464 and 466 are disabled.

Figure 12A:
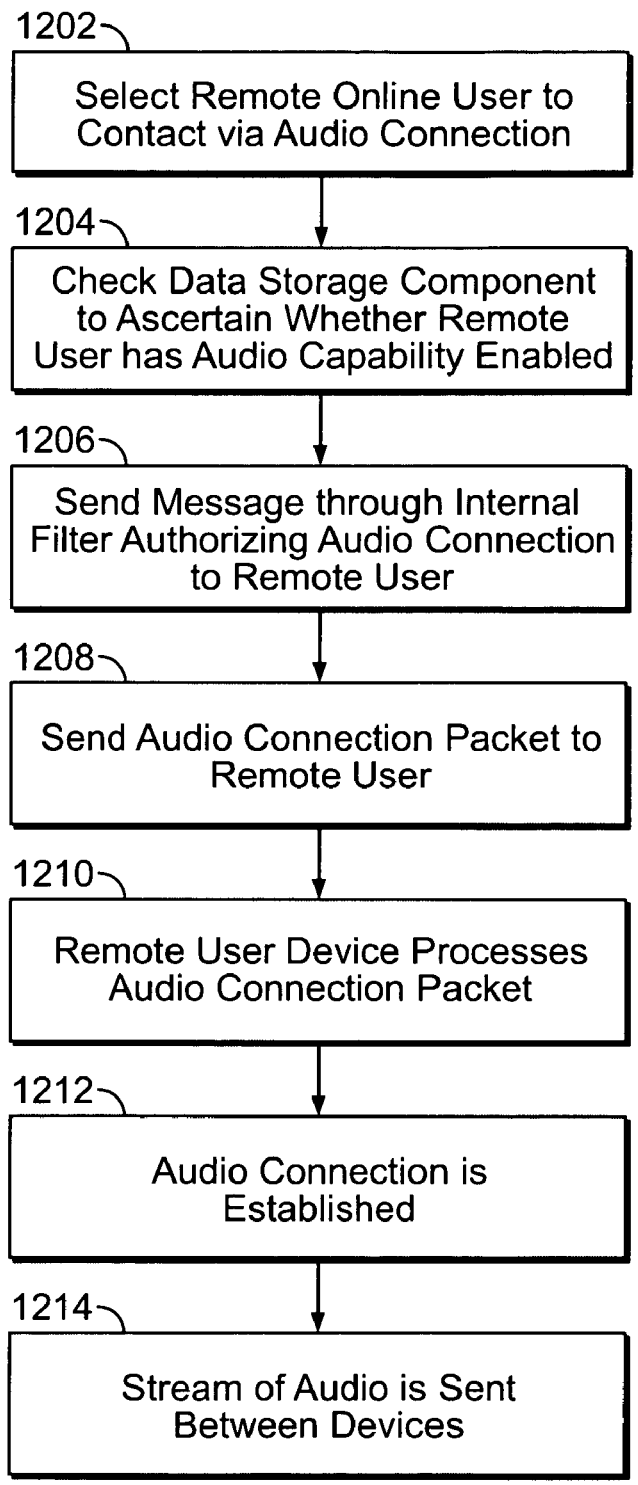
FIG. 12A is a communication flow diagram illustrating the steps for audio communication between network communication devices.

The process for establishing audio connection is shown in FIG. 12A. In step 1202, a remote on line user is selected for an audio communication connection. After connector 450, FIG. 4, is clicked, in step 1204, the requesting network communication device checks the capabilities of the remote user in its data storage component 240, FIG. 2, ascertaining whether audio capability is enabled for the select user. If audio capability is present, in step 1206, a message is sent through audio input/output filter 352 of the network communication device for the sender, authorizing sending of an audio connection packet to the remote user. In step 1208, FIG. 12A, the audio connection packet is sent to the network communication device 120 of the remote user. In step 1210, FIG. 12A, incoming packet queuing process 322 of the remote user receives the packet and sends it to packet filter process 324, which ascertains its purpose. Remote users can block requests for audio connection by disconnecting connector 450 or by disabling broadcast local audio enabler 462 and remote audio enabler 466. Assuming both devices remain audio enabled, in step 1210, a secure network connection is established and streaming audio can occur over a transmission control protocol ("TCP") in step 1212, FIG. 12A, with audio capture 350 obtaining audio streams from remote users. Compression and amplification filters 354 and 356 respectively reduce the number of bits sent over the network and clarify audio transmission. Network communication devices 120 may, for example, rely on Voice over Internet Protocol (VoIP) for audio communication, though other methodologies may be employed.

Figure 12B:
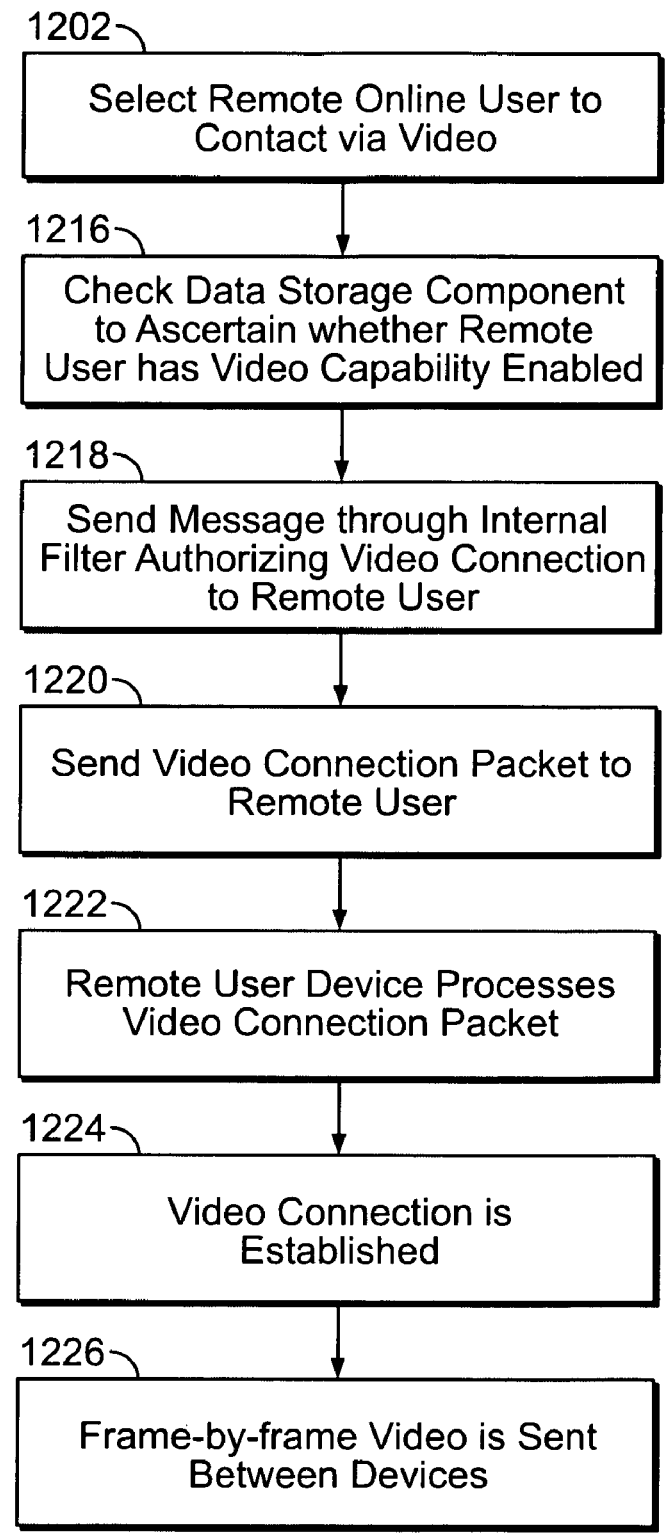
FIG. 12B is a communication flow diagram illustrating the steps for video communication between network communication devices.

The process for establishing video connection is shown in FIG. 12B. Similar to audio connection, once a user clicks connector 450, FIG. 4, to select, in step 1202, FIG. 12B, a remote user for video contact, the requesting network communication device 120, FIG. 1, checks the data storage component to ascertain whether a remote user is video capability enabled, in step 1216. If video capability is present, in step 1218, FIG. 12B, a message is sent through video display process 370 of the sender network communication device, authorizing sending of the video connection packet to the remote user. In step 1220, FIG. 12B, the video connection packet is sent to the network communication device 120 of the remote user. In step 1222, incoming packet queuing process 322 of the remote user receives the packet and sends it to packet filter process 324, which ascertains its purpose. Remote users can block requests for video connection by disconnecting connector 450 or by disabling broadcast local video enabler 464. In step 1224, FIG. 12B, video connection is established. Assuming both devices remain video enabled, in step 1226, a request for a video frame is issued by the video display process of the sender and remote user network communication devices 120. The requesting network communication device sends a single video frame to the remote network communication device along with a request for a frame of video from the remote device. The remote network communication device receives the frame, processes the received frame and responds to the request by sending its own single video frame back. As these single frames are being sent back and forth, a second video frame is concurrently written by each device. Once the second frame is written, a third frame overwrites the first. In other words, once the system finishes writing a frame, it is sent and cleared to make way for the writing of a new frame, which, in turn is forwarded among the communicating users. This asynchronous transfer of data is repeated. In this way, a secure network connection is established and video transfer occurs over UDP. The network communication devices 120 may employ a frame-by-frame streaming JPEG format, which preserves video quality, even if network connections are interrupted.

Referring back to the graphical user interface 400 of FIG. 4, each of the three activity areas 402, 404, 406 may advantageously be minimized or rearranged into different configurations. For example, voice/video chat activity area 404, FIG. 4, and file transfer activity area 406 may be minimized while chat/instant message activity area 402 is in use. Alternatively, file transfer activity area 406 may be positioned above chat/instant message activity area 402. That is, each activity area behaves as a separate unit or module, comprising its own toolbar 404 and navigation bar 406. Clicking on dock/undock icon 422 either fixes one of the activity areas in a specific location or frees it from a docked location. When an activity area is in an undocked state, navigation bar 406 may be employed to minimize, maximize and rearrange individual activity areas.

Referring to FIG. 13, an example communication log 1300 representing a historic record of communications having occurred within the wireless network is shown. The core application process advantageously provides compiling and maintenance of the log documenting all communications taking place between the different network communication devices in the wireless local area network. The log identifies all text-based messages, audio and video communications, and file transfers between network communication devices within the local area network. The log is stored in memory component 210, FIG. 1, and may be accessed at a later time to confirm prior communications.

Wireless networks created in accordance with the connectivity as well as the data, voice and video capabilities described herein can advantageously be employed in a variety of situations. They are particularly useful when traditional structured network communications are unavailable—for example when cell towers and/or centralized servers are inoperable. These wireless networks can be immediately deployed, established and utilized for communications in such situations including disaster relief, public safety, military conflicts, mining accidents and other emergency medical situations.

The foregoing description of the preferred embodiments of the invention have been presented for purposes of illustration and description, and are not intended to be exhaustive or to limit the invention to the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

We claim:

1. A method for establishing and maintaining a wireless network comprising:

providing a plurality of network communication devices corresponding to a plurality of users, the network communication devices continuously broadcasting network participation packets to other network communication devices within a first predetermined interval, with each network participation packet comprising a unique user identifier corresponding to each user;

establishing the wireless network through receipt and processing of the network participation packets by the network communication devices;

storing the unique user identifiers for the users within the wireless network;

providing a plurality of remote user status variables, each variable associated with one of the unique user identifiers;

determining whether the network participation packets, associated with each user are being received within a second predetermined interval; and adjusting the remote user status variable according to whether the network participation packets are being received within the second predetermined interval.

2. The method of claim 1, wherein the network communication devices are adapted to communicate text, voice and video data with each other in the absence of a centralized server responsible for authenticating and coordinating the network communication devices entering the wireless network.

3. The method of claim 1, further comprising sending at least one status request to the network communication device of each user whose remote status variable has reached a predetermined threshold.

4. The method of claim 3, wherein each network communication device comprises audio or video capabilities.

5. The method of claim 4, further comprising continuously sending a current status of audio and video capabilities for each user throughout the wireless network to be updated at each network communication device upon receipt thereof.

6. The method of claim 3, wherein the remote user status variable is an integer and the integer increases by one each time the network participation packet is not received within the second predetermined interval.

7. The method of claim 3, wherein adjusting the remote user status variable further comprises resetting the remote user status variable upon receipt of network participation packets from each network communication device within the second predetermined interval.

8. The method of claim 1, further comprising removing unique user identifiers from the database if the at least one status request is not acknowledged.

* * * * *